J. H. SINER.
FEED BUCKET HOLDER.
APPLICATION FILED MAY 7, 1910.
1,014,264.
Patented Jan. 9, 1912.
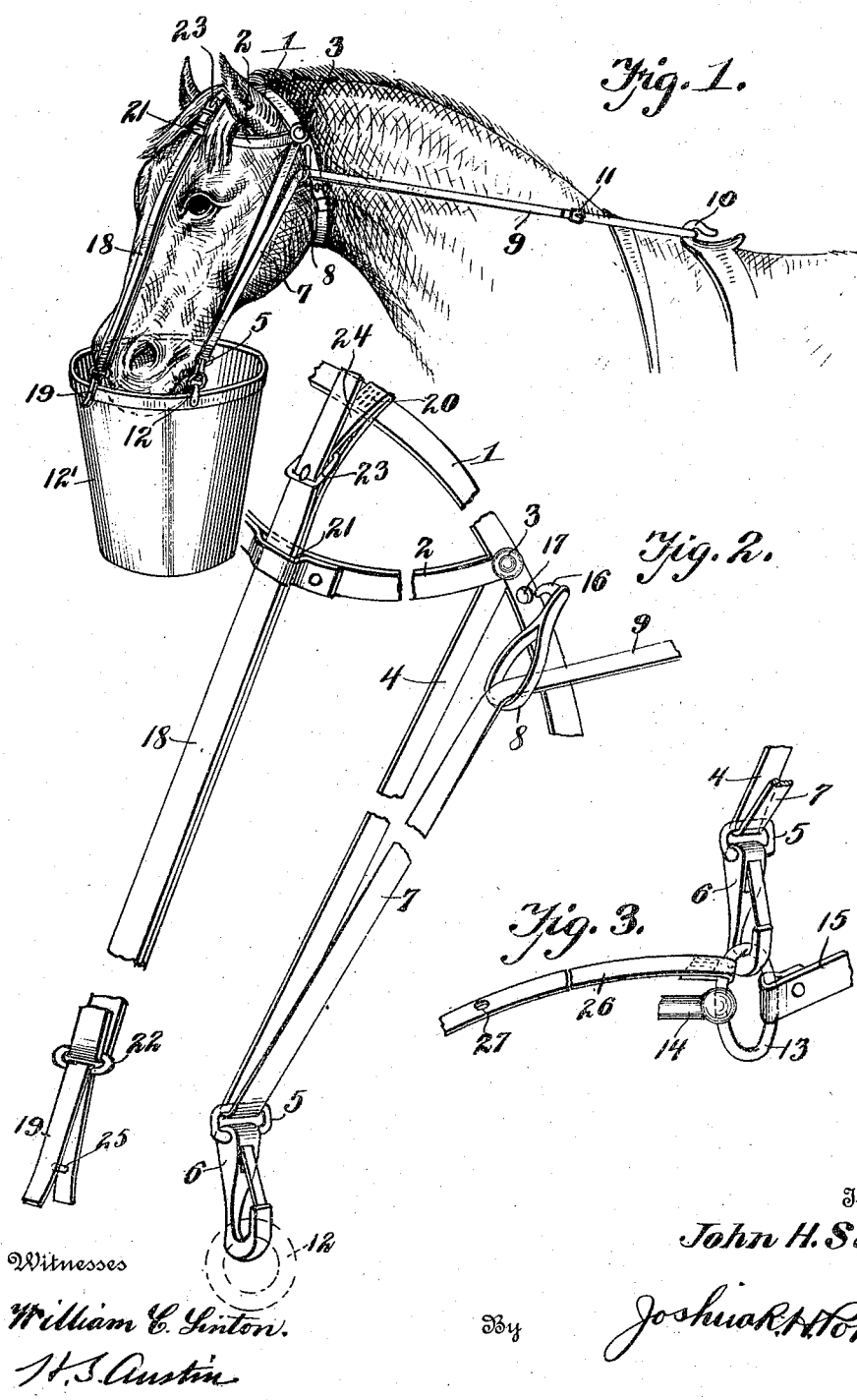
Witnesses
William E. Linton.
H. S. Austin
Inventor
John H. Siner.
By Joshua R. H. Potts,
Attorney

UNITED STATES PATENT OFFICE.

JOHN HARDY SINER, OF PIMENTO, INDIANA.

FEED-BUCKET HOLDER.

1,014,264.　　Specification of Letters Patent.　　Patented Jan. 9, 1912.

Application filed May 7, 1910. Serial No. 559,898.

*To all whom it may concern:*

Be it known that I, JOHN H. SINER, a citizen of the United States, residing at Pimento, county of Vigo, and State of Indiana, have invented certain new and useful Improvements in Feed-Bucket Holders, of which the following is a specification.

My invention relates to feed bucket or feed bag supports, that is, to devices for holding the feed bucket or bag upon the head of a horse in position to be readily accessible to the animal when feeding.

One object of my invention is to provide an improved device for holding a feed bucket or bag which shall also serve as a bridle for the horse.

A further object of my invention is to provide a device of the character mentioned adapted to hold or support any bag or bucket having rings or eyes at its upper end such as those into which the bail of the bucket is secured.

A further object of my invention is to provide an improved device of the class mentioned whereby the horse may raise his head from the bucket or lower the same thereinto as desired without resting the bucket upon the ground or other support.

Other objects will appear hereinafter.

My invention will be more readily understood by reference to the accompanying drawings forming a part of this specification and in which—

Figure 1 is a perspective view illustrating a device embodying my invention arranged upon the head of a horse, Fig. 2 is an enlarged perspective view of a portion of the device, and Fig. 3 is a detail perspective view illustrating the manner of attaching the bit to the device.

Referring now to the drawings 1 indicates the usual head band and 2 the brow band connected at each side by the rosettes 3. Secured to the head band, preferably by the rosettes, is a strap 4 upon each side. The strap 4 extends downwardly adjacent the mouth where it passes through a loop or eye 5 on a hook member 6 and then upwardly as at 7 passing through a loop or eye 8 on the head band and then rearwardly forming a check rein 9 adapted to be attached over the check hook 10. The rein portion 9 is provided with a buckle 11 whereby the length of the strap may be regulated as will be described hereinafter.

The hook members 6 are preferably snap hooks as shown and are adapted to receive the rings or eyes 12 of a bucket or feed bag. By this construction any form of bag or bucket may be employed having a ring or eye such as those in which the bail of an ordinary bucket is secured. When it is desired to feed the horse any ordinary bucket may be used if found convenient, by merely removing the bail and snapping the hooks 6 in the bail eyes or ears. When the device is used as a bridle the rings 13 on the bit 14 are secured in the hooks 6.

15 indicates the rein attached to the bit ring.

The loop 8 is preferably an elongated metal ring provided with a hook 16 which enters an eyelet 17 in the head band.

When using the device to support a feed bucket the bit is detached from the hooks 6 and the bucket 12' secured thereto. The length of the strap 4—7—9 is then adjusted by the buckle 11 and the rein 9 hooked over the check hook 10. As the horse lowers his head the bucket is raised with relation to the head as is obvious and as the horse raises his head the bucket will drop slightly with relation thereto.

To prevent the bucket from swinging out of reach of the horse should he raise his head entirely from the same, I provide an adjustable strap 18 having a clamp 19 at its lower end to engage the rim of the bucket as shown in Fig. 1. The strap 18 is secured to the head band 1 as at 20, passes downwardly through a loop 21 formed on the brow band, through a loop or eye 22 on the clamp 19 and back through the loop 21 to a buckle 23 secured to the head band by a short strap 24 formed by turning the end of strap 18 back upon itself as illustrated. By means of the buckle 23 the length of the strap 18 may be adjusted as found necessary. The clamp 19 is provided with a pin or lug 25 on the inner face of one of its jaws which affords means for a better hold on the bucket or bag than could be obtained without the use of the same. A nose strap 26 is secured to the bit rings 13 and this is provided with an eyelet 27 which receives the pin or lug 25 when the device is used as a bridle to hold the strap 18 and clamp 19 from hanging loose at such times.

Having described my invention what I claim as new and desire to secure by Letters Patent is:

1. In a device of the class described, head and brow bands connected by the usual rosettes, loops fixed to said head band adjacent said rosettes, straps secured to said head band upon each side, said straps extending downwardly and then upwardly through said loops and then rearwardly, adjustable means connecting their ends whereby the straps may be adjusted to form a check rein, and snap hooks slidably mounted on said straps between the rosettes and said loops, whereby a feed bucket may be supported from said snap hooks when the straps are extended and a bit secured to the same when the straps are adjusted to form a check rein substantially as described.

2. In a device of the class described, the head and brow bands connected by the usual rosettes, loops fixed to said head band adjacent said rosettes, straps fixed to said head band upon each side thereof, said straps extending downwardly and then upwardly through said loops and then rearwardly, an adjustable connection between the ends of said straps, hooks slidably mounted on said straps between said head band and said loops, a strap fixed to the center of said head band and extending downwardly therefrom, a clamp at the lower portion of said strap, means for adjusting the length of said strap, a bit, rings on the ends of said bit adapted to be engaged by said hooks, a nose band connecting said rings and provided with an eyelet near the center and a lug on the inner face of one jaw of said clamp to engage said eyelet when the bit is in use substantially as described.

In testimony whereof I have signed my name to this specification in the presence of two subscribing witnesses.

JOHN HARDY SINER.

Witnesses:
JESSE J. FRENCH,
E. P. FRENCH.